(12) United States Patent
Liao et al.

(10) Patent No.: US 9,342,098 B2
(45) Date of Patent: May 17, 2016

(54) DISPLAY APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Quan Liao, Shenzhen (CN); Te-Hsu Wang, New Taipei (TW); Chih-Kang Cho, New Taipei (TW); Zhan-Ao Yu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/548,477

(22) Filed: Nov. 20, 2014

(65) Prior Publication Data

US 2015/0138708 A1    May 21, 2015

(30) Foreign Application Priority Data

Nov. 20, 2013    (CN) .......................... 2013 1 0583806

(51) Int. Cl.
*G06F 1/16*    (2006.01)
(52) U.S. Cl.
CPC .................................. *G06F 1/1601* (2013.01)
(58) Field of Classification Search
CPC ........ G06F 1/1601; H04N 5/64; H02B 1/048; H02B 1/044
USPC ............ 361/679.04–679.07, 679.21–679.25, 361/679.26–679.29, 679.3, 679.55–679.56; 200/296; 248/917–924; 348/836
See application file for complete search history.

(56) References Cited

U.S. PATENT DOCUMENTS

| | | | | |
|---|---|---|---|---|
| 5,455,743 A * | 10/1995 | Miyajima | ............ | H05K 5/0017 200/296 |
| 5,623,393 A * | 4/1997 | Yau | .......................... | H04N 5/64 200/296 |
| 7,465,895 B2 * | 12/2008 | Yoshida | ................. | H01H 9/161 200/310 |
| 7,786,399 B2 * | 8/2010 | Wang | .................... | G06F 1/1601 200/296 |
| 8,144,268 B2 * | 3/2012 | Fujikawa | ............... | H01H 13/86 312/7.2 |
| 2007/0144883 A1 * | 6/2007 | Guo | ..................... | H01H 9/0214 200/296 |

* cited by examiner

*Primary Examiner* — Hoa C Nguyen
*Assistant Examiner* — Sagar Shrestha
(74) *Attorney, Agent, or Firm* — Novak Druce Connolly Bove + Quigg LLP

(57) ABSTRACT

A display apparatus includes a display body, an operation member with an operation portion and a mounting portion, a bracket, and a gripping member. The operation member is slidably mounted on the inside of the bracket. The bracket includes a bracket body and a receiving member with a resisting portion. The gripping member is movably received in the receiving member and includes a gripping body, a pressing portion, and two or mover gripping arms. The mounting portion is positioned between the gripping arms positioning the operation member within the bracket body allowing the operation portion to drive the mounting member and the gripping member to slide. The pressing portion resists the resisting portion so that the gripping arms may be spread to disengage from the mounting portion.

20 Claims, 5 Drawing Sheets

DISPLAY APPARATUS

CROSS-REFERENCE TO RELATED APPLICATIONS

This application claims priority to Chinese Patent Application No. 201310583806.3 filed on Nov. 20, 2013 in the China Intellectual Property Office, the contents of which are incorporated by reference herein.

FIELD

The subject matter herein generally relates to support structures within computers and displays.

BACKGROUND

A computer comprises a display body and an operation member mounted to the display body. The operation member has a function within the display body. An apparatus is used to secure the operation member to the display body.

BRIEF DESCRIPTION OF THE DRAWINGS

Implementations of the present technology will now be described, by way of example only, with reference to the attached figures.

DETAILED DESCRIPTION

Figure 1:
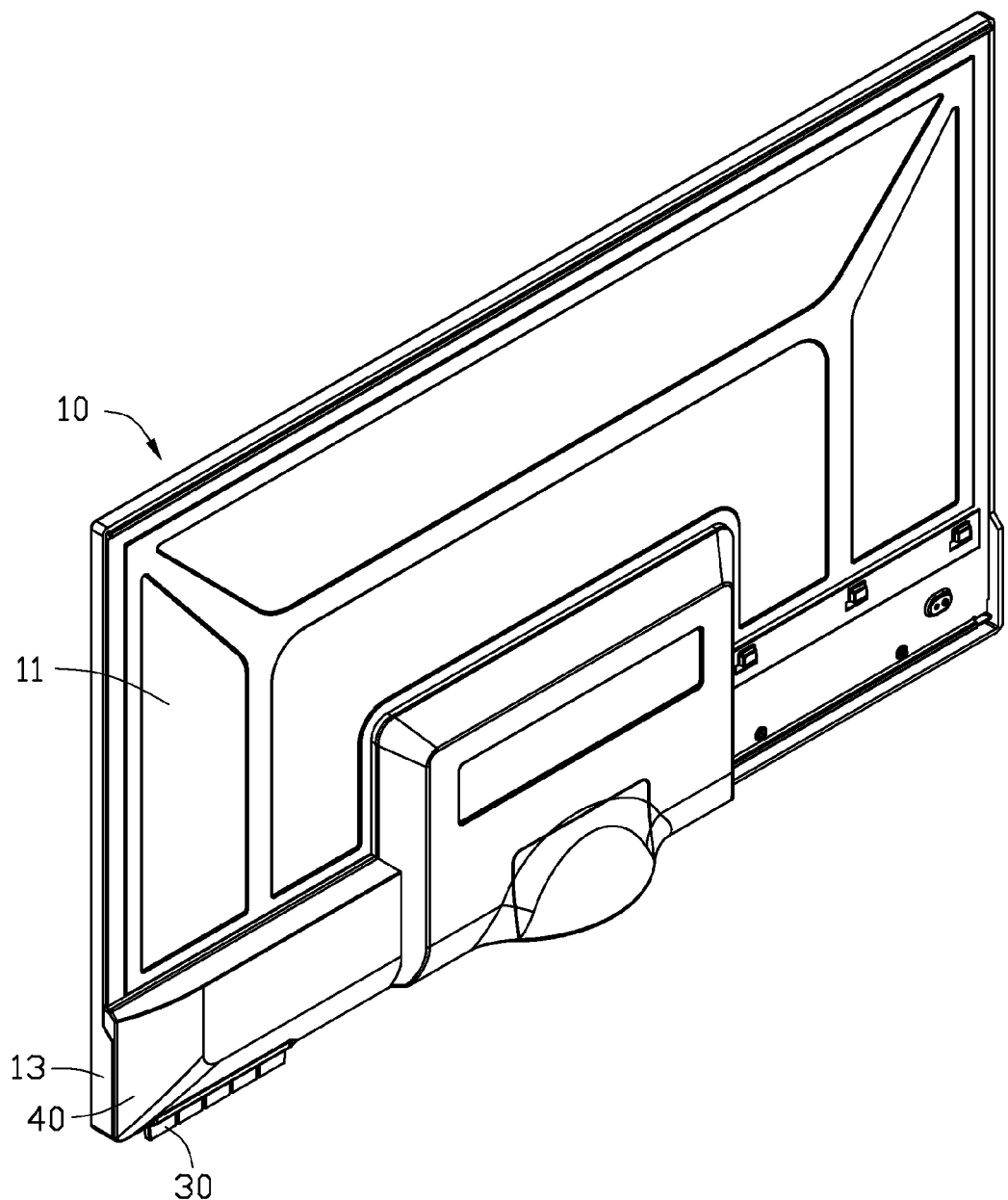
FIG. 1 is an assembled isometric view of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "comprising, but not necessarily limited to"; it specifically indicates open-ended inclusion or membership in the so-described combination, group, series and the like.

The present disclosure describes a display apparatus in a computer.

Figure 2:
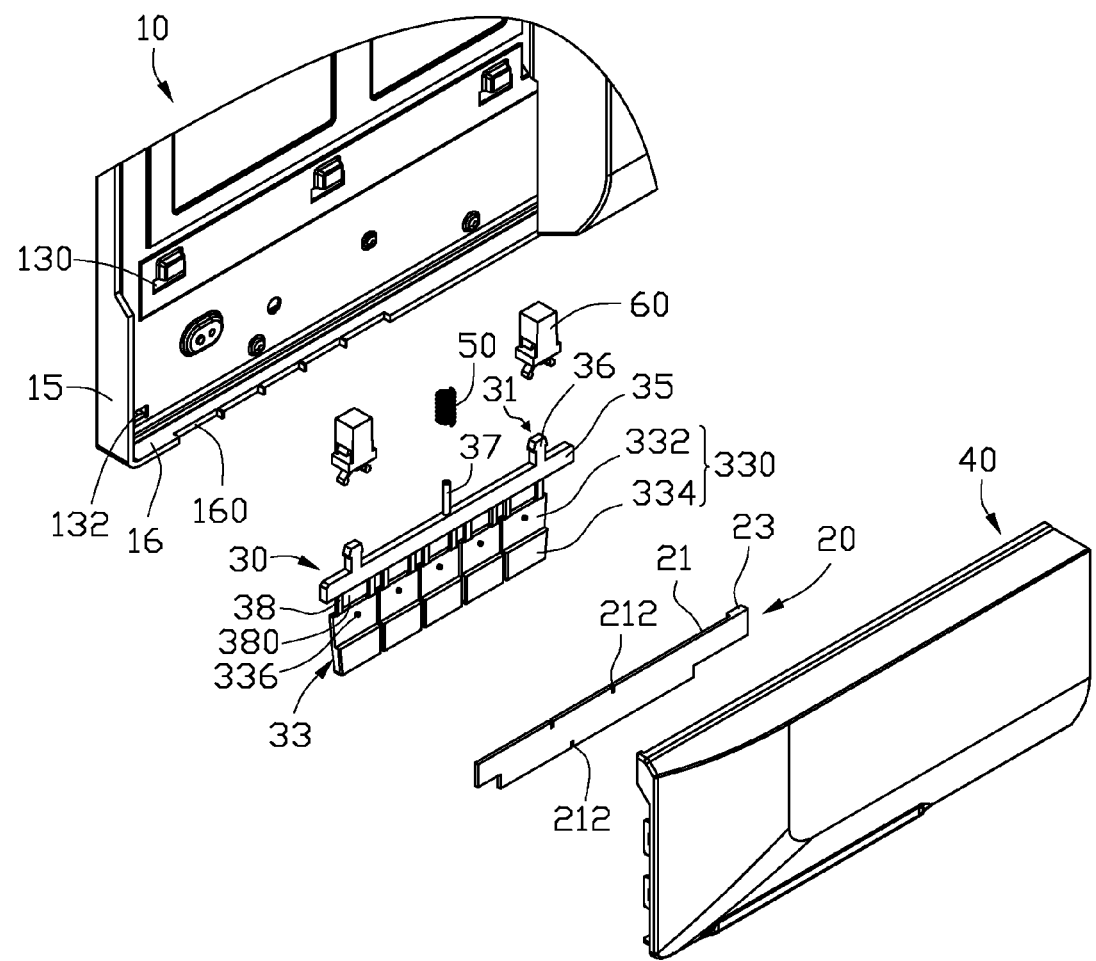
FIG. 2 is an exploded, isometric view of an embodiment of the display apparatus of FIG. 1.

FIGS. 1 and 2 illustrate an embodiment of a display apparatus. The display apparatus comprises a display body 10, a securing plate 20, an operation member 30, a bracket 40, and two gripping members 60.

Figure 3:
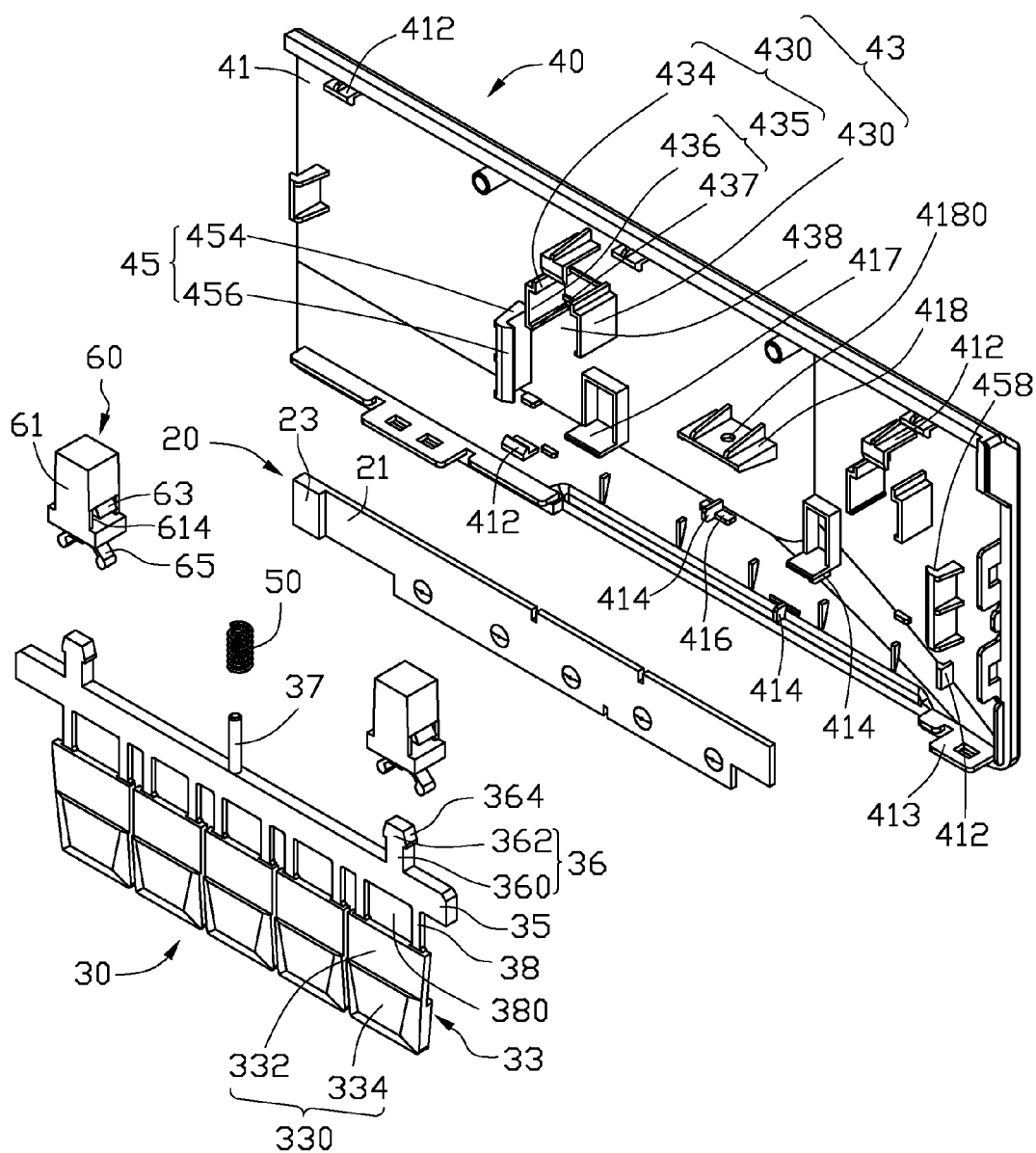
FIG. 3 is similar to FIG. 2, but viewed from a different angle and without a display body.

Referring to FIGS. 1-3, the display body 10 comprises a frame body 11 and a securing portion 13 coupled to the frame body 11. The mounting portion 13 comprises a bent edge 15 and a bottom edge 16 coupled substantially perpendicularly to the bent edge 15. The bottom edge 16 defines a plurality of receiving slots 160. The securing portion 13 defines a plurality of mounting holes 130 and an engaging hole 132.

The securing plate 20 comprises a plate body 21 and a resisting edge 23 extending from an end portion of the plate body 21. The plate body 21 defines a plurality of positioning portions 210 and three cutouts 212. The plate body 21 is substantially T-shaped.

The operation member 30 comprises a mounting portion 31 and an operation portion 33. The mounting portion 31 comprises a supporting portion 35, two engaging portions 36, a mounting post 37, and a plurality of mounting bars 38. The two engaging portions 36 and the mounting post 37 are located on a first side of the supporting portion 35. The mounting bars 38 are located on a second side of the supporting portion 35. The mounting post 37 is located between the two engaging portions 36. Each engaging portion 36 comprises a side portion 360 extending substantially perpendicularly from the supporting portion 35 and a positioning piece 362 extending substantially perpendicularly from the side portion 360. Each engaging portion 36 comprises two inclined sliding surfaces 364. The side portion 360 is substantially parallel to the mounting post 37. A cross section of each positioning piece 362 is substantially an isosceles trapezoid. Each engaging piece 36 is substantially T-shaped. The operation portion 33 comprises a plurality of pressing keys 330. Each pressing key 330 comprises a connecting portion 332 and an operation key 334 extending from the connecting portion 332. Each connecting portion 332 comprises a protrusion 336 corresponding to the positioning portion 210. The operation key 334 is substantially quadrate. Each mounting bar 38 is coupled to one connecting portion 332. The mounting bars 38 are substantially parallel to each other. The supporting portion 35, the connecting portion 332, and one pair of the mounting bars 38 cooperatively define an opening 380. Each mounting bar 38 is substantially parallel to the mounting post 37. The mounting post 37 is configured to be the mounting for an elastic member 50. In one embodiment, the elastic member 50 is a spring.

The bracket 40 comprises a bracket body 41, two receiving members 43, two limiting pieces 45, and a plurality of hooks 412, two engaging tabs 413, two positioning blocks 414, a plurality of supporting blocks 416, two supporting plates 417, and a mounting plate 418. The mounting plate 418 is located between the two supporting plates 417 and defines a mounting hole 4180. One of the positioning blocks 414 is substantially perpendicularly coupled to two of the supporting blocks 416 to form the shape of a crosshead.

Each receiving member 43 comprises a pair of receiving pieces 430 extending from the bracket body 41. Each receiving piece 430 comprises a resisting portion 434 and a positioning wall 435. The resisting portion 434 is substantially L-shaped. The positioning wall 435 comprises a side wall 436 extending from the resisting portion 434 and an engaging block 437 extending inwardly from the side wall 436. A space 438 for mounting the engaging member 60 is bounded by one pair of the receiving pieces 430 and one hook 412.

Each limiting piece 45 comprises a side portion 454 extending from the bracket body 41 and a flange 456 extending inwardly from the side portion 454. The two side portions 454 are substantially parallel to each other. A sliding slot 458 is cooperatively defined by the side portions 454 and the flange 456. The two supporting plates 417 located between the two limiting pieces 45.

Each gripping member 60 comprises a gripping body 61, a pressing portion 63 extending from the gripping body 61, and two gripping arms 65. The gripping body 61 is substantially an inverted Tin shape. The gripping body 61 defines a through hole 614. The pressing portion 63 extends out of the through hole 614.

Figure 4:
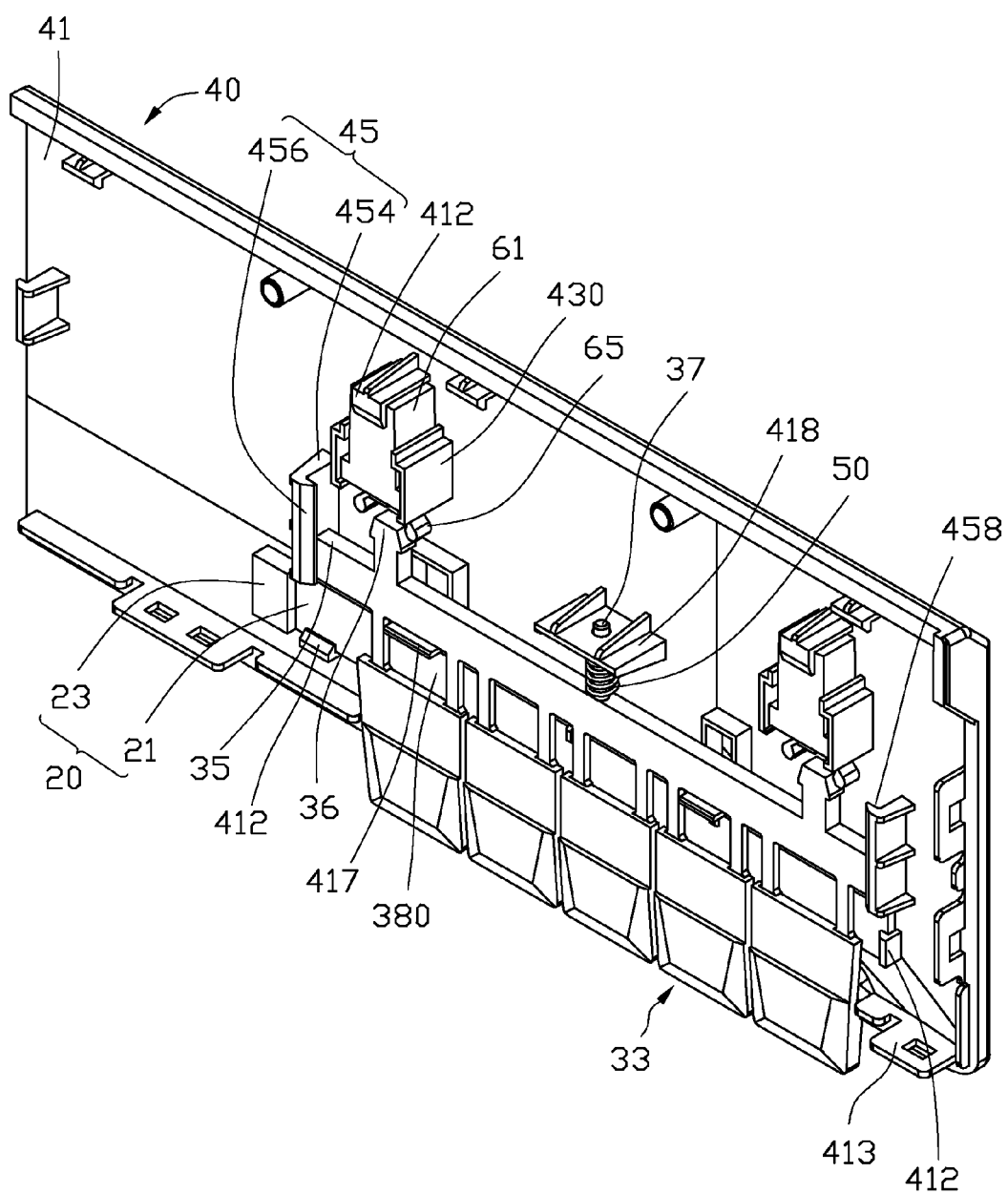
FIG. 4 is an assembled isometric view of the display apparatus of FIG. 3, but without the display body and an operation member being in a first position.

Referring to FIGS. 2-4, in assembly, the gripping members 60 are placed in the space 438. The gripping bodies 61 are sandwiched between the engaging block 437 and the hook 412 to prevent the gripping members 60 from moving out of the space 438. The cutouts 212 are aligned with the positioning blocks 414. The bracket body 41 is moved to enable the positioning blocks 414 to be positioned in the cutouts 212. The plate body 21 resists between the limiting pieces 45 and the hook 412, and is located between and limited in movement by the supporting plate 417 and the hook 412. The resisting edge 23 is located outside of one limiting piece 45. The gripping members 60 are mounted to the bracket 40. The elastic member 50 is mounted to the mounting post 37. The operation member 30 is moved. The mounting post 37 is inserted into the mounting hole 4180. The protrusions 336 are aligned with the positioning portions 210. Two ends of the supporting portions 35 are received in the sliding slots 458. The supporting plates 417 are received in the openings 380. The elastic member 50 is located between the mounting plate 418 and the supporting portions 35. The supporting plates 417 are supported on an edge of the openings 380. The operation member 30 is mounted on the bracket 40 and is in a first position. The hook 412 is engaged with the mounting hole 130. The engaging tab 413 is engaged with the engaging hole 132. The bracket 40 is received in the receiving slot 160. The bracket 40 is mounted to the display body 10.

Figure 5:
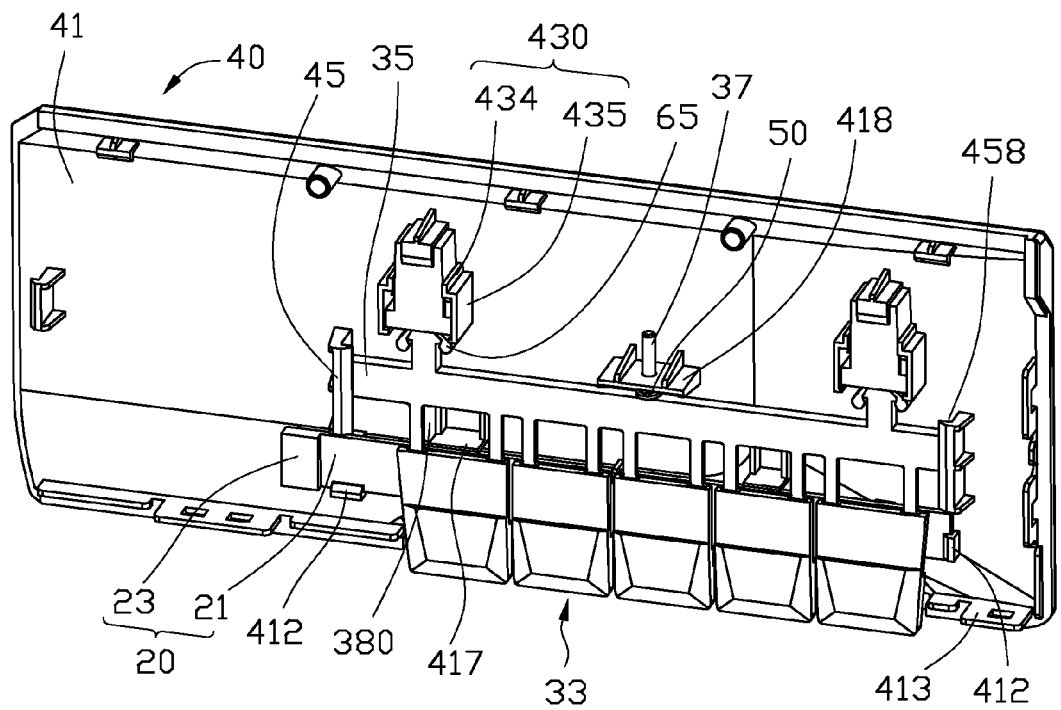
FIG. 5 is similar to FIG. 4, but without the display body and the operation member being in a second position.

Referring to FIGS. 3-5, in use, the operation portion 33 is operated to move the operation member 30. The engaging portions 36 are received in the gripping arms 65. The operation member 30 is in a second position. The operation member 30 is moved to drive the pressing portion 63 to abut the resisting portion 434. The pressing portion 63 drives the gripping arms 65 to spread out. The elastic member 50 elastically resists between the mounting plate 418 and the supporting portion 35. The engaging portions 36 disengage from the gripping arms 65. The elastic member 50 rebounds to drive the operation member 30 to move to the first position.

It is to be understood that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A display apparatus comprising:
    a display body;
    a bracket having:
        a bracket body mounted to the display body; and
        a receiving member with a resisting portion;
        an operation member slidably mounted within the bracket, the operation member having:
            an operating portion; and
            a mounting portion extending from the operating portion;
        a gripping member movably received by the receiving member and having:
            a gripping body;
            a pressure portion;
            two or more gripping arms extending from the gripping body;
    wherein, the mounting portion is positioned between the two or more gripping arms positioning the operation member within the bracket body allowing the operation portion to drive the mounting member and the gripping member to slide;
    wherein, the pressing portion resists the resisting portion so that the gripping arms spread to disengage from the mounting portion.

2. The display apparatus of claim 1, wherein the receiving member comprises a receiving piece with the resisting portion and the gripping member movably receives in the receiving piece.

3. The display apparatus of claim 2, wherein each receiving piece comprises a positioning wall extending from the resisting portion and limiting the gripping member to move.

4. The display apparatus of claim 3, wherein the bracket further comprises a hook extending from the bracket body and engaging with the gripping member to limit the gripping member to move.

5. The display apparatus of claim 1 wherein the bracket further comprises two limiting pieces extending from the bracket body; the mounting portion is slidably mounted between the two positioning pieces.

6. The display apparatus of claim 1, wherein the mounting portion comprises an engaging portion with two inclined sliding surfaces and the engaging portion is sandwiched between the two gripping arms.

7. The display apparatus of claim 6, wherein the engaging portion comprises a side portion and a positioning piece extending substantially perpendicular from the side portion, thus the engaging portion is substantially T-shaped.

8. The display apparatus of claim 7, wherein a cross section of the positioning piece is substantially isosceles trapezoid.

9. The display apparatus of claim 1, wherein the bracket body comprises a hook; the receiving member comprises a positioning wall with a side wall extending from the resisting portion and an engaging block extending from the side wall; the gripping member movably receives in the hook, the side wall, and the engaging block.

10. The display apparatus of claim 1, wherein the resisting portion is substantially L-shaped.

11. A display apparatus comprising:
    a display body;
    a bracket having:
        a bracket body mounted to the display body; and
        a receiving member with two resisting portions;
        an operation member slidably mounted within the bracket, the operation member having:

an operating portion; and a mounting portion extending from the operating portion;

a gripping member movably received by the receiving member and having:

a gripping body;

a pressure portion extending from the gripping body;

two or more gripping arms extending from the gripping body;

wherein, the mounting portion is positioned between the two or more gripping arms positioning the operation member within the bracket body allowing the operation portion to drive the mounting member and the gripping member to slide;

wherein, the pressing portion resists the resisting portions so that the gripping arms spread to disengage from the mounting portion.

12. The display apparatus of claim 11, wherein the receiving member comprises two receiving pieces; the resisting portions are defined in the corresponding receiving pieces; the gripping member movably receives between the two receiving pieces.

13. The display apparatus of claim 12, wherein each receiving piece comprises a positioning wall extending from one resisting portion and limiting the gripping member to move along a second direction different from the first direction; the second direction is substantially parallel to the bracket body.

14. The display apparatus of claim 13, wherein the bracket further comprises a plurality of hooks extending from the bracket body and engaging with the gripping member to limit the gripping member to move along a third direction substantially perpendicular to the bracket body.

15. The display apparatus of claim 11, wherein the bracket further comprises two limiting pieces extending from the bracket body; the mounting portion is slidably mounted between the two positioning pieces.

16. The display apparatus of claim 15, wherein each limiting piece comprises a side portion extending from the bracket body and a flange extending from the side portion; the mounting portion can slide on the two side portions and the two flanges limit the operation member to move along a fourth direction substantially perpendicular to the bracket body.

17. The display apparatus of claim 11, wherein the bracket further comprises a supporting plate extending from the bracket body; the mounting portion comprises a plurality of connecting bars coupled to the operation portion, a supporting portion coupled to the connecting bars, and an engaging portion coupled to the supporting portion; the supporting plate receives in the connecting bars and supports the supporting portion; the engaging portion is sandwiched between the two gripping arms.

18. The display apparatus of claim 11, wherein the bracket further comprises a mounting plate extending from the bracket body; an elastic member resists between the mounting portion and the mounting plate; the elastic member rebounds when two gripping arms disengages from the mounting portion.

19. The display apparatus of claim 18, wherein the mounting portion comprises a supporting portion and a mounting post coupled to the supporting portion; the elastic member is mounted to the mounting post and elastically resists between the supporting portion and the mounting plate.

20. The display apparatus of claim 11, further comprises a plate body with a cutout; the bracket further comprises a positioning block extending from the bracket body and positioning in the cutout; the plate body is substantially T-shaped.

* * * * *